United States Patent [19]

Gammage et al.

[11] 4,224,519

[45] Sep. 23, 1980

[54] METHOD OF IMPROVING BEO AS A THERMOLUMINESCENT DETECTOR

[75] Inventors: Richard B. Gammage, Oak Ridge, Tenn.; John H. Thorngate, Livermore, Calif.; Danny J. Christian, Knoxville, Tenn.

[73] Assignee: The United States of America as represented by the Department of Energy, Washington, D.C.

[21] Appl. No.: 52,179

[22] Filed: Jun. 26, 1979

[51] Int. Cl.² ............................................. G01T 1/11
[52] U.S. Cl. .................................... 250/337; 307/354
[58] Field of Search ............... 250/337, 484; 307/354, 307/358, 359; 328/115, 150

[56] References Cited

U.S. PATENT DOCUMENTS

3,449,593  6/1969  Marino .................................. 328/150

OTHER PUBLICATIONS

Kaul et al., "High Sensitivity Apparatus for Low Level TL Detection", Modern Geology, vol. 6, No. 2, Mar. 1977, pp. 87–91.

*Primary Examiner*—Alfred E. Smith
*Assistant Examiner*—Carolyn E. Fields
*Attorney, Agent, or Firm*—R. V. Lupo; Stephen D. Hamel

[57] ABSTRACT

Measurements of radiation exposure below 1 mR are possible with a BeO ceramic thermoluminescent detector (TLD) by treating the TL signal in a manner that discriminates against an interferring pyroelectric incandescence (PI). This is accomplished by differentiating the signals electronically to cause the composite signal to cross the baseline. A zero-crossing detector then senses and clips the negative-going portion of the signal. The resultant signal is integrated, producing a result wherein the true TL signal is substantially greater than the PI signal.

3 Claims, 4 Drawing Figures

METHOD OF IMPROVING BEO AS A THERMOLUMINESCENT DETECTOR

BACKGROUND OF THE INVENTION

The present invention relates to solid state radiation detectors and more particularly to ceramic BeO utilized as a thermoluminescent detector (TLD). This invention is a result of a contract with the U.S. Department of Energy.

Considerable research has been conducted at the Oak Ridge National Laboratory (ORNL), and at other sites, relative to the use of ceramic BeO as radiation detectors. Initially, such material was considered as a thermally stimulated exoelectron (TSEE) detector for various forms of ionizing radiation. Such detectors are the subject matter of U.S. Pat. No. 3,484,610, issued Sept. 23, 1968, to Klaus H. Becker. Subsequent ORNL research has been conducted relative to BeO as a thermoluminescent detector (TLD), and the results of such research have been published in Health Physics, 32, 189 (1977), in an article by R. B. Gammage et al.

Despite the touted advantages of BeO as a TLD, there has been limited acceptance for fieldwork. A principal reason is a limited lower level of detectability, generally of the order of a few mR (e.g., 10). The principal reason for this has been determined to be the interference of a nonradiation-induced emission, called pyroelectric incandescence (PI), with the radiation-induced TL.

Therefore, it is the object of the present invention to provide a thermoluminescent radiation detector and a readout system wherein accurate measurements of radiation exposure below 1 mR are possible.

Other objects, advantages and novel features of the invention will become apparent to those skilled in the art upon examination of the following detailed description of a preferred embodiment of the invention and the accompanying drawings.

SUMMARY OF THE INVENTION

Measurements of radiation exposures below 1 mR are possible with a BeO ceramic thermoluminescent detector (TLD) by treating the TL signal in a manner that discriminates against an interferring pyroelectric incandescence (PI). This is accomplished by differentiating the signals electronically to cause the composite signal to cross the baseline. A zero crossing detector then senses and clips the negative-going portion of the signal. The resultant signal is integrated, producing a result wherein the true TL signal is substantially greater than the PI signal.

DESCRIPTION OF THE PREFERRED EMBODIMENT

Figure 1:
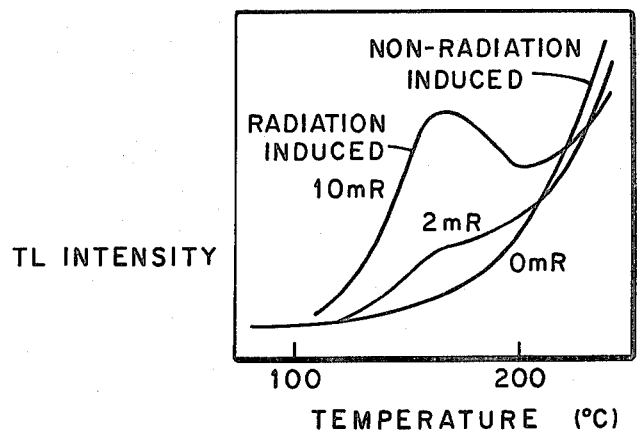
FIG. 1 is a plot illustrating TL intensity, as a function of heating temperature, from a BeO TLD when exposed to several dose levels of radiation.

Referring first to FIG. 1, there is shown thereon a series of glow curves obtained by heating an unexposed and two lightly exposed BeO (Thermalox 995) disks. The upper curve is for a disk irradiated to 10 mR; the central curve, to 2 mR; and the bottom curve is for an unirradiated disk and thus indicates the pyroelectric incandescence. It can be seen that the PI signal nearly masks the radiation-induced signal at 2 mR; and even at 10 mR the peak-to-valley ratio is small. This illustrates the difficulty in use of the BeO TLD at low radiation exposures, i.e., in the range of a few tens of mR, where a dosimeter is often needed for personal and environmental monitoring.

Figure 2:
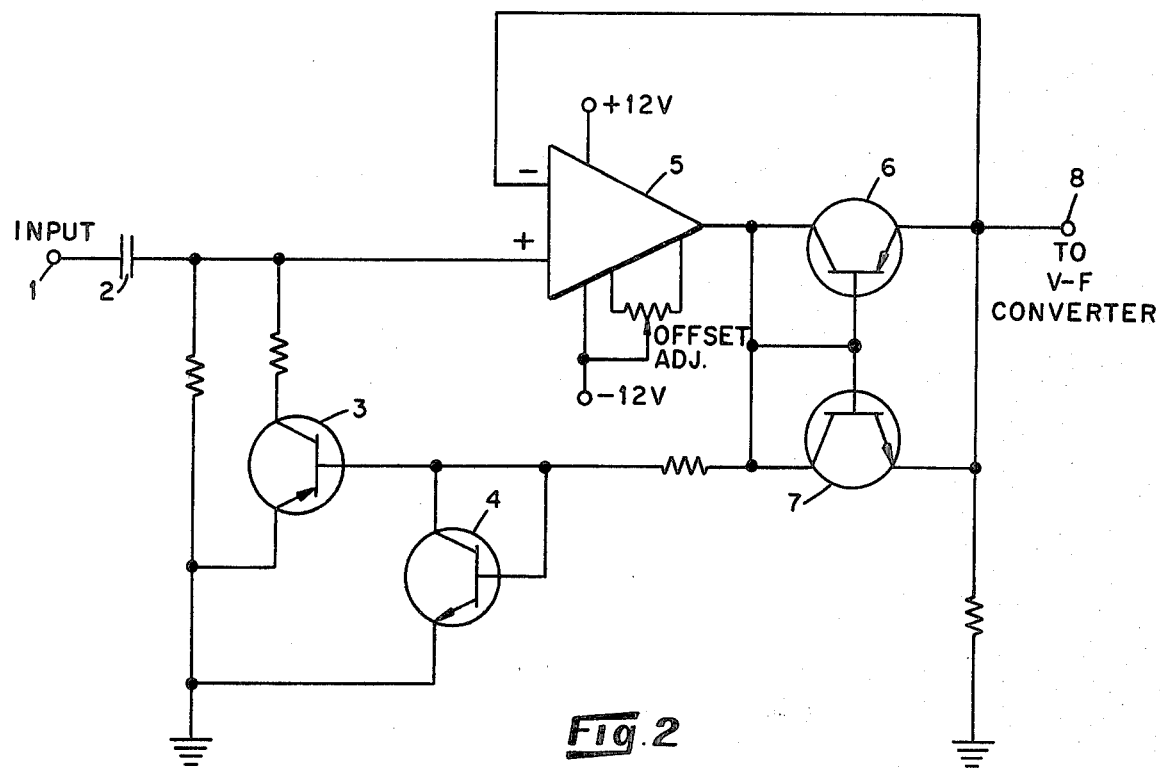
FIG. 2 is a schematic diagram of a circuit designed to reduce the PI component of signals derived during the heating of TLD units (BeO)

The major improvement in achieving a lowered minimum detection level is accomplished in the present invention with the circuit shown in FIG. 2 of the drawings, wherein peak shaping and clipping are effected.

Figure 3:
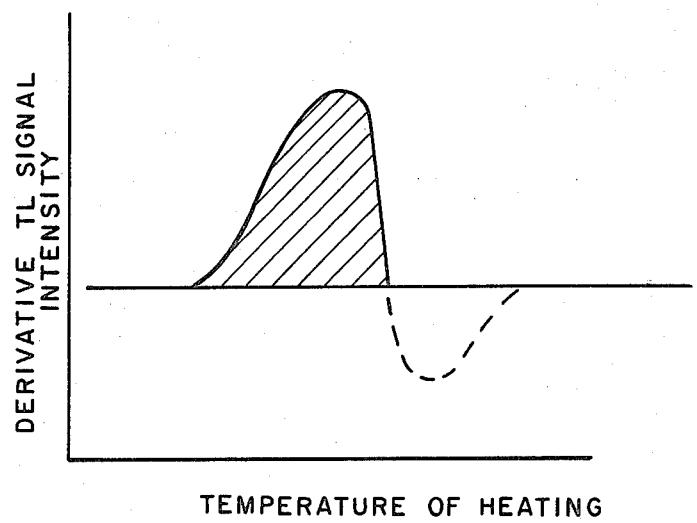
FIG. 3 is a drawing of the waveform of the signal derived from the circuit of FIG. 2.

In FIG. 2, the d.c. signal appearing at the input terminal 1, from a photomultiplier (PM) (as appearing at the output of a picoammeter associated with a TL reader) not shown, is blocked by a 2.2 $\mu f$ capacitor 2, and the remaining circuitry of FIG. 2 shapes and clips the remaining PM signal. The capacitor 2 is coupled to an amplifier 5 provided with an offset adjustment as shown. The circuit then differentiates the signal giving rise to a peaked signal shape as shown in FIG. 3. Only the positive portion of the signal is integrated such that the time constant of the circuit during this interval is about 22 seconds and a 12 volt signal appears at the output of the amplifier 5 which is fed back to the transistors 3 and 4 and the signal is clipped by the transistor 4 resulting in turning on the transistor 3. At this time the zero-crossover is reached, the output of the amplifier 5 drops to a minus $\frac{1}{2}$ volt, and the time constant of the circuit is then about 22 msec such that the negative-going portion of the signal in FIG. 3 is clipped in a short time, and the circuit is then ready to receive the next signal from the photomultiplier.

The amplifier 5 is coupled to a pair of transistors 6 and 7 that act as diodes to stabilize the output therefrom and are coupled to an output terminal 8 which is coupled to a V-F converter, not shown. The positive portion of the pulse is highly proportional to the radiation-induced luminescence of the detector, with the PI portion of the detector signal being suppressed.

In addition to the above-described improvement, it should be noted that stabilization of the background is achieved by ensuring reproducible thermal contact between the irradiated BeO disk and the heater planchette of a reader unit.

Figure 4:
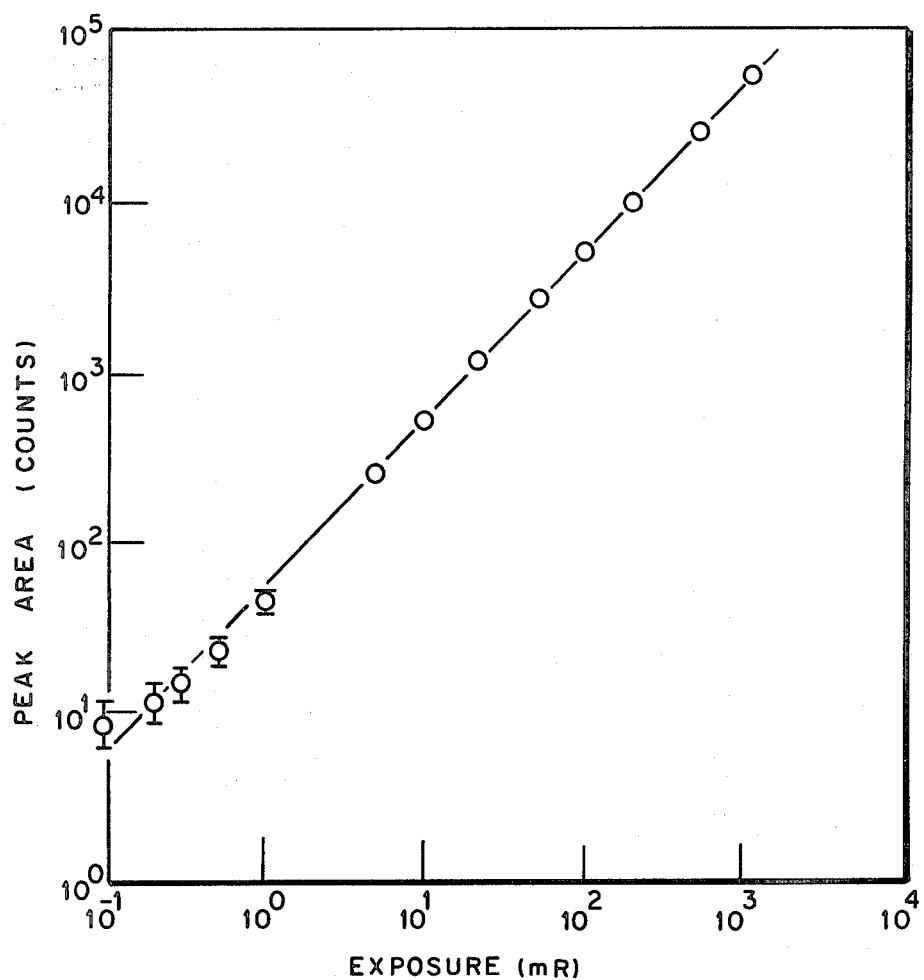
FIG. 4 is a plot showing the response of a BeO TLD to gamma radiation using the circuit of FIG. 2.

Superior sensitivity and reproducibility ensue from the present invention, with a minimum detectable exposure reduced to about 0.1 mR from a previous minimum of about 2 mR. The response of a BeO TLD to $137_{Cs}$ (gamma) radiation, when using the circuit of FIG. 2, is shown in FIG. 4 of the drawings. Thus, it should be evident that the present invention will provide a more efficient method in personal and environmental monitoring.

Likewise in discriminating radiation-induced luminescence from other interferring effects, such as infrared "oven glow," this method of signal recording would be advantageous. This is a problem general to all types of TL phosphor where one's intent is to record high temperature peaks.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

What is claimed is:

1. An improved method for discriminating against an interferring pyroelectric incandescence and thus lowering the minimum detectable level of a radiation-exposed, thermoluminescent detector, comprising the steps of heating said exposed detector in a reader unit, coupling the resultant signal from said reader unit to a photomultiplier, blocking the d.c. portion of the output signal from said photomultiplier, differentiating the remaining portion of said photomultiplier output signal to provide a signal shape having a positive-going portion and a negative-going portion, determining the zero-crossover of said signal shape, and clipping said negative-going portion, resulting in a final output signal wherein the positive portion of said pulse shape is highly proportional to the radiation-induced luminescence of said detector and said interferring pyroelectric incandescence of said detector is suppressed, thereby effecting said lowering of the minimum detectable level.

2. The method set forth in claim 1, wherein said detector is a ceramic BeO disk.

3. The method set forth in claim 2, wherein the minimum detectable level achieved by said method is 0.1 mR.

* * * * *